(12) United States Patent
Tucker

(10) Patent No.: US 6,543,175 B1
(45) Date of Patent: Apr. 8, 2003

(54) PORTABLE STAND FOR CAMOUFLAGE

(76) Inventor: Brian Tucker, 4449 County Rd. 221, Moulton, AL (US) 35650

( * ) Notice: Subject to any disclaimer, the term of this patent is extended or adjusted under 35 U.S.C. 154(b) by 0 days.

(21) Appl. No.: 09/842,068

(22) Filed: Apr. 26, 2001

Related U.S. Application Data

(60) Provisional application No. 60/213,999, filed on Jun. 26, 2000.

(51) Int. Cl.⁷ .............................. F41A 35/04; A01G 5/04
(52) U.S. Cl. ................. 42/94; 43/1; 47/41.01; 47/41.12
(58) Field of Search .............. 42/94; 43/1, 2, 43/3; 47/39, 41.01, 41.12–41.14

(56) References Cited

U.S. PATENT DOCUMENTS

| | | | |
|---|---|---|---|
| 780,118 A | * 1/1905 | Mosier | 47/41.13 |
| 2,151,192 A | 3/1939 | Crosser | |
| 2,974,443 A | * 3/1961 | Beagle | 47/41.13 |
| 3,033,504 A | 5/1962 | Cronin | |
| 3,193,852 A | 7/1965 | Murrmann | |
| 4,449,542 A | * 5/1984 | McSwain et al. | 135/16 |
| 4,552,479 A | * 11/1985 | Nickow et al. | 281/31 |
| 4,813,441 A | 3/1989 | Kepley | |
| 5,037,052 A | 8/1991 | Crisp et al. | |
| 5,062,234 A | * 11/1991 | Green | 135/901 |
| 5,142,833 A | * 9/1992 | Svehaug | 428/919 |
| 5,351,425 A | * 10/1994 | Knappe et al. | 40/751 |
| 5,572,823 A | * 11/1996 | Savaria | 43/1 |
| 5,609,176 A | * 3/1997 | Weeks | 135/117 |
| 5,628,487 A | 5/1997 | Huber | |
| 5,669,403 A | 9/1997 | Belcher et al. | |
| D402,170 S | 12/1998 | Cox | |
| 6,199,212 B1 | * 3/2001 | Hambleton | 2/171 |
| 6,296,005 B1 | * 10/2001 | Williams et al. | 135/98 |
| 6,306,471 B1 | * 10/2001 | Pitman et al. | 135/901 |

FOREIGN PATENT DOCUMENTS

| | | |
|---|---|---|
| CA | 1319878 | 7/1993 |
| GB | 2167168 | 5/1986 |
| WO | 97/05351 | 2/1997 |

* cited by examiner

*Primary Examiner*—Charles T. Jordan
*Assistant Examiner*—Bret Hayes
(74) *Attorney, Agent, or Firm*—Waddey & Patterson; Larry W. Brantley

(57) ABSTRACT

A portable folding stand for camouflage includes a generally flat base with a generally flat camouflage holder portion foldably hinged thereto. The camouflage holder portion is generally semicircular, with a straight attachment edge and a circular periphery having a series of branch holder sockets disposed therealong. The base includes a pair of opposed passages therethrough, for accepting a set of spikes or the like for anchoring the device to the ground. The hunter, photographer, wildlife observer, etc. deploys the present camouflage stand by inserting the two spikes through their passages and driving the spikes into the underlying terrain, unfolding the camouflage holder to deploy the holder generally perpendicular to the base, cutting a series of tree or shrub branches or the like, and inserting the freshly cut branches into the camouflage holder sockets to deploy the branches radially generally in a single plane, in a generally fan-like array.

18 Claims, 3 Drawing Sheets

PORTABLE STAND FOR CAMOUFLAGE

CROSS-REFERENCE TO RELATED APPLICATION

This application claims the benefit of U.S. Provisional Patent Application Ser. No. 60/213,999, filed Jun. 26, 2000.

BACKGROUND OF THE INVENTION

1. Field of the Invention

The present invention relates generally to the art of concealment, and more particularly to a portable, collapsible stand for holding and supporting natural foliage (tree branches, etc.) for use as camouflage for the hunter or observer of wild game.

2. Description of the Related Art

Hunters have long realized the importance of concealing themselves from game which is being hunted, and/or other potentially dangerous animals. More recently, increased interest in photographing or merely observing wild animals in their natural habitats, has led to the further development of camouflage of various types. While hunters (and others) may make use of various scents or other effects in an effort to conceal themselves from animals, perhaps the most important type of camouflage or concealment, is that achieved by visual means.

Accordingly, hunters have developed innumerable visual camouflage techniques, ranging from merely concealing oneself behind some natural cover (trees, brush, rocks, etc.), to wearing animal skins or constructing a blind of natural materials. One problem with such inanimate visual camouflage, is that its location is fixed and cannot be moved as the hunter or observer seeks a more advantageous position or follows the game as it moves. Many hunters or observers will cut and deploy natural foliage to form a makeshift blind at their location. While the foliage forming such a temporary blind is readily movable, it does not necessarily provide a realistic appearance. Also, it may be difficult to imbed the cut ends of the branches and twigs into the underlying surface, if the surface is hard or rocky. Thus, the hunter or observer merely lays the foliage in place upon the underlying surface, with the generally horizontal orientation of the branches providing an appearance quite unlike their natural appearance as a living plant.

Accordingly, a need will be seen for a portable stand for holding and supporting a plurality of natural foliage branches in a reasonably realistic array, in order to provide realistic camouflage for a hunter or wildlife observer. The present stand is quite portable, with the foliage support portion folding compactly against the flat base for storage when not in use. The present device is quite compact when folded, for convenient portability.

A discussion of the related art of which the present inventor is aware, and its differences and distinctions from the present invention, is provided below.

U.S. Pat. No. 2,151,192 issued on Mar. 21, 1939 to David H. Crosser, titled "Flower And Candle Holder," describes a device comprising a base with a plurality of elongated spirally formed flower and candle supporting members of resilient material having their lower end portions embedded in the base and extending divergently upwardly and outwardly therefrom. The spring-like candle holder members of the Crosser device are deployed in a generally circular pattern about the circular horizontal base of the device, rather than forming a fan-like pattern disposed generally in a single vertical plane, as is the case with the foliage holding elements of the present camouflage holder. In any event, the Crosser device is not foldable for convenient portability and storage, as is the case with the present camouflage holder invention.

U.S. Pat. No. 3,033,504 issued on May 8, 1962 to Kathleen V. Cronin, titled "Tree Branch Holder," describes a bracket for securing additional branches to the trunk of a tree, as in an artificially constructed Christmas tree or the like. The Cronin device comprises a sleeve having a substantially closed end with an opposite open end for receiving a tree branch or the like. The closed end has a screw hole therethrough for attaching the device to the trunk of a tree. The opposite open end includes a series of barbs therearound for gripping a branch. The Cronin device is only capable of holding one branch at a time and the only support is provided by screw attachment to another branch, unlike the plural branch support provided by the present camouflage stand invention.

U.S. Pat. No. 3,193,852 issued on Jul. 13, 1965 to Fred A. Murrmann, titled "Blind Holder," describes an elongate, hollow tube having a plurality of apertures at spaced longitudinal and circumferential locations. Individual plant stalks, branches or the like may be inserted randomly through opposed passages in the tube. The tubes may be suspended from hooks to hang from the gunwale of a boat or about the waist of a hunter, etc. However, the Murrmann holder does not provide any means of positively anchoring the device to the underlying surface, as provided by the present camouflage holder. Moreover, the Murrmann device is relatively bulky, due to the length(s) of the tube(s). The present device provides a very compact base with a folding support extending therefrom, with the support also having a compact size due to the radial array of branch holders extending therefrom.

U.S. Pat. No. 4,813,441 issued on Mar. 21, 1989 to Charles F. Kepley, titled "Camouflage Device For Hunter's Seat," describes an extension for attaching to the foot rest of a conventional tree stand, as used by hunters and wildlife photographers, etc. The extension has an elongate crossmember extending therefrom, with the crossmember having a series of sockets therein for holding cut shrubbery or the like for camouflage. The elongate crossmember presents the same storage problems as the elongate tubes of the '852 Murrmann U.S. Patent discussed immediately above. As noted above, the present camouflage holder with its folding, radially disposed branch holder, provides an extremely compact device for convenient transport and storage when not in use.

U.S. Pat. No. 5,037,052 issued on Aug. 6, 1991 to Joe E. Crisp et al., titled "Clamp Assembly System," describes a system for supporting camouflage around a hunter using a tree stand. The Crisp et al. clamp assembly comprises a series of clamps which are screwed to the wooden tree stand seat, with each clamp having adjustable jaws for securing a tree branch or the like therein. Each of the jaws is arcuately adjustable for orienting the branch held therein, as desired. The Crisp et al. clamps are each separate units, capable of holding only a single branch each. Moreover, they must be assembled to a tree stand seat, board, or other suitable support, whereas the branch holders of the present camouflage holder are integrated with and foldably attached to the base structure.

U.S. Pat. No. 5,628,487 issued on May 13, 1997 to John S. Huber, titled "Fixture For Camouflage," describes a device formed of a single, short length of thin wall tubing or conduit, etc. The tube is flattened in the center with the two ends then bent to form a generally V-shaped configuration, with the two arms extending from the flattened center portion. A bolt or the like is inserted through the crease between the two arms at the apex of the V, for securing the device to another structure as desired. The Huber camouflage holder is only capable of holding two branches, whereas the present holder can hold a much larger number of branches. Moreover, the Huber device must be immovably attached to another structure for support, while the present branch holder includes a base to which the branch holder portion is foldably attached.

U.S. Pat. No. 5,669,403 issued on Sep. 23, 1997 to Michael M. Belcher et. al., titled "Hunting Blind Adapted To Be Mounted In A Tree," describes a generally cylindrical frame having an open top and bottom, with the sides of the frame being covered by a fabric sheet camouflage material. The Belcher et al. device can be disassembled for storage and transport, and includes various features providing for adjustability. However, the Belcher et al. blind does not provide any means for supporting natural tree or shrubbery branches, as provided by the present camouflage holder.

U.S. Design Pat. No. 402,170 issued on Dec. 8, 1998 to D. Blake Cox, titled "Tree Limb Holder," illustrates a device comprising a central cylindrical tube with a pair of tubes branching angularly therefrom. The central tube includes a screw extending from one end thereof. No base, either fixed or folding, is shown with the Cox design, and moreover, the number of branches which may be supported by the Cox holder is limited in comparison to the present camouflage holder invention.

British Patent Publication No. 2,167,168 published on May 21, 1986 to John R. Poiner, titled "Supporting Camouflage Net," describes a device having a generally convex support surface with a mounting socket extending therebelow and a series of gripping pins extending upwardly therefrom. The device is adapted for placement upon the end of a support pole, with the pins penetrating the relatively coarse camouflage material to hold it in place. The Poiner device cannot be adapted for use as a holder for a plurality of tree or shrubbery branches, as provided by the present invention.

Canadian Patent Publication No. 1,319,878 published on Jul. 6, 1993 to Edward O. Horsmann, titled "Hunting Blind Structure," describes a game bird hunting blind having a flattened cylindrical shape. The Horsmann device is completely closed, but includes a series of openable panels. No means is provided for holding any natural tree or shrubbery branches or the like, as provided by the present camouflage holder invention. The size of the Horsmann blind and its frame results in a relatively heavy and bulky structure even when folded, precluding convenient carriage and storage of the device when it is not in use.

Finally, International Patent Publication No. WO 97/05351 published on Feb. 13, 1997 to Vincent G. Coory et al., titled "A Shelter," describes a portable hunting shelter which can be readily erected and secured over a ground surface to provide camouflage for a hunter. The device comprises a generally trapezoidal frame about which a fabric camouflage sheet is secured. The top of the device remains open. No means is provided for securing one or more branches of natural shrubbery thereto, as provided by the present camouflage stand. The shelter of the Coory et al. International Patent Publication is thus more closely related to the blinds of the '878 Canadian Patent Publication and '403 U.S. Patent, both discussed further above, than to the present camouflage holder invention.

None of the above inventions and patents, taken either singly or in combination, is seen to describe the instant invention as claimed.

SUMMARY OF THE INVENTION

The present portable camouflage stand provides concealment for observation of wildlife by sportsmen, hunters, birdwatchers, wildlife photographers, outdoorsmen, and any other persons who enjoy nature and the environment. The present camouflage stand is collapsible and portable, providing camouflage to its user by attaching branches of recently cut, fresh local flora into a temporary structure resembling a natural bush or shrub. The present camouflage stand invention includes a generally flat base with a generally flat and semicircular camouflage holder plate foldably hinged thereto. The camouflage holder includes a series of sockets in a radial array, with each socket providing for the insertion of a tree branch or the like therein. The branches or limbs may be cut on site for insertion into the sockets. The resulting array of branches presents a realistic natural appearance, while deploying the bases of the branches in a single plane to allow the hunter, photographer, etc. to aim his or her rifle or camera through the branches for an unobstructed shot.

The base of the device includes a passage at each end thereof, for the insertion of a spike or other similar pin therethrough for anchoring the device to the ground. When the present camouflage stand is to be deployed, the user need only unfold the branch holder from the base, drive the spikes or pins into the ground to anchor the device as desired, cut a series of live foliage branches, and insert them into the sockets of the branch holder to provide realistic camouflage for hunting, photography, etc.

Accordingly, it is a principal object of the invention to provide a new and improved portable stand for natural camouflage materials, such as shrubbery, tree branches, and the like.

It is a further object of the invention to provide effective camouflage having a natural and realistic appearance, which closely resembles adjacent flora.

It is another object of the invention to provide such a camouflage stand including a flat base with a generally flat camouflage holder portion foldably and hingedly secured thereto.

It is an additional object of the invention to provide a series of branch holder sockets in the camouflage holder portion, with the branch holder sockets deployed radially in a single plane.

Yet another object of the invention is to provide a camouflage stand having a base which includes passages therethrough for positively anchoring the device to the underlying surface by means of a pair of spikes or the like.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a collapsible and portable stand, providing camouflage through the selective use of natural materials such as brush, branches, and limbs or any other suitable vegetation. Experts in camouflage overwhelmingly agree that three dimensional camouflage, as opposed to two dimensional camouflage (which depends on two dimensional cloth patterns and designs), is one of the most powerful forms of concealment available, and provides a much more realistic effect since light is scattered in many directions after being reflected off of the planes defined by the camouflaging body (conventionally spatially delimited by mutually orthogonal X, Y, and Z axes). This is because three dimensional objects create natural shadows and depth, can reflect and disperse light, and, if sufficiently configured, can move with the wind and other elements, simulating the movement of natural materials, such as leaves, more closely. Detecting motion of another creature is one of the most important ways in which animals can sense the presence of a predator or other onlooker, and conventional two dimensional camouflage patterns provide little effective concealment in this regard.

In a solution to this problem, the present invention allows for the incorporation of fresh branches of local flora into a three dimensional, camouflaging structure resembling live natural foliage. The present portable camouflage stand holds branches or brush in a generally radial, fan like pattern, for optimum deployment from a relatively small base. Because these branches or limbs may be cut on site for insertion into the apparatus of the invention, the user in the field experiences an almost unparalleled ability to quickly and easily blend into the local environment.

Figure 1:
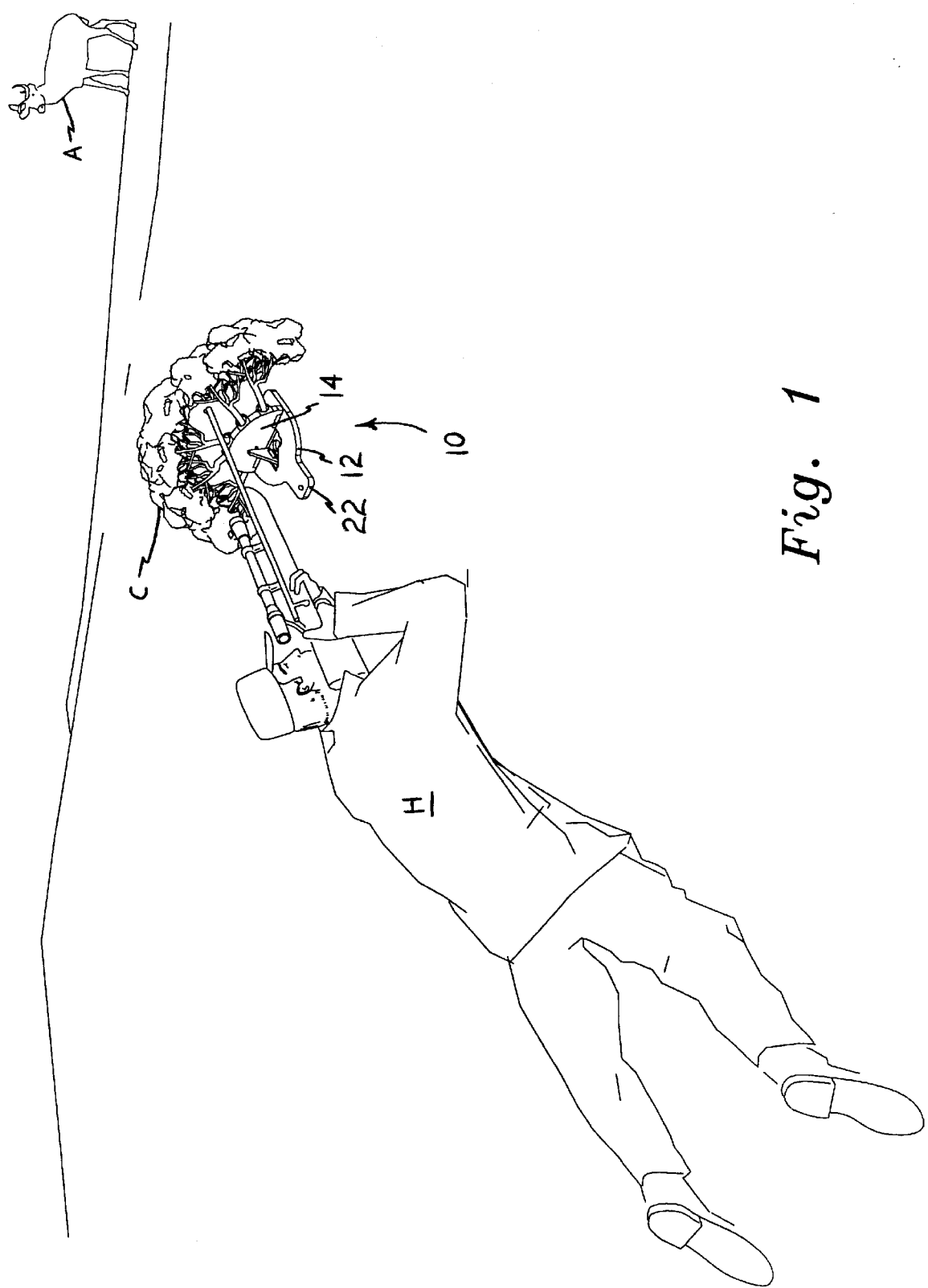
FIG. 1 is an environmental rear perspective view of the present portable stand for camouflage according to the present invention, showing the stand deployed with natural camouflage secured therein.

FIG. 1 of the drawings provides an environmental perspective view of the present portable stand 10, showing its use in holding natural camouflage materials C for concealing a hunter H from a game animal A. The present portable stand for camouflage 10 essentially comprises a base 12 and a camouflage holder portion 14, which is hingedly attached to the base 12. The basic components of the present camouflage stand 10, including the base 12 and foldable camouflage holder portion 14, may be formed of a durable plastic, or alternatively any suitable material (aluminum or other metal, etc.) as desired.

Figure 2:
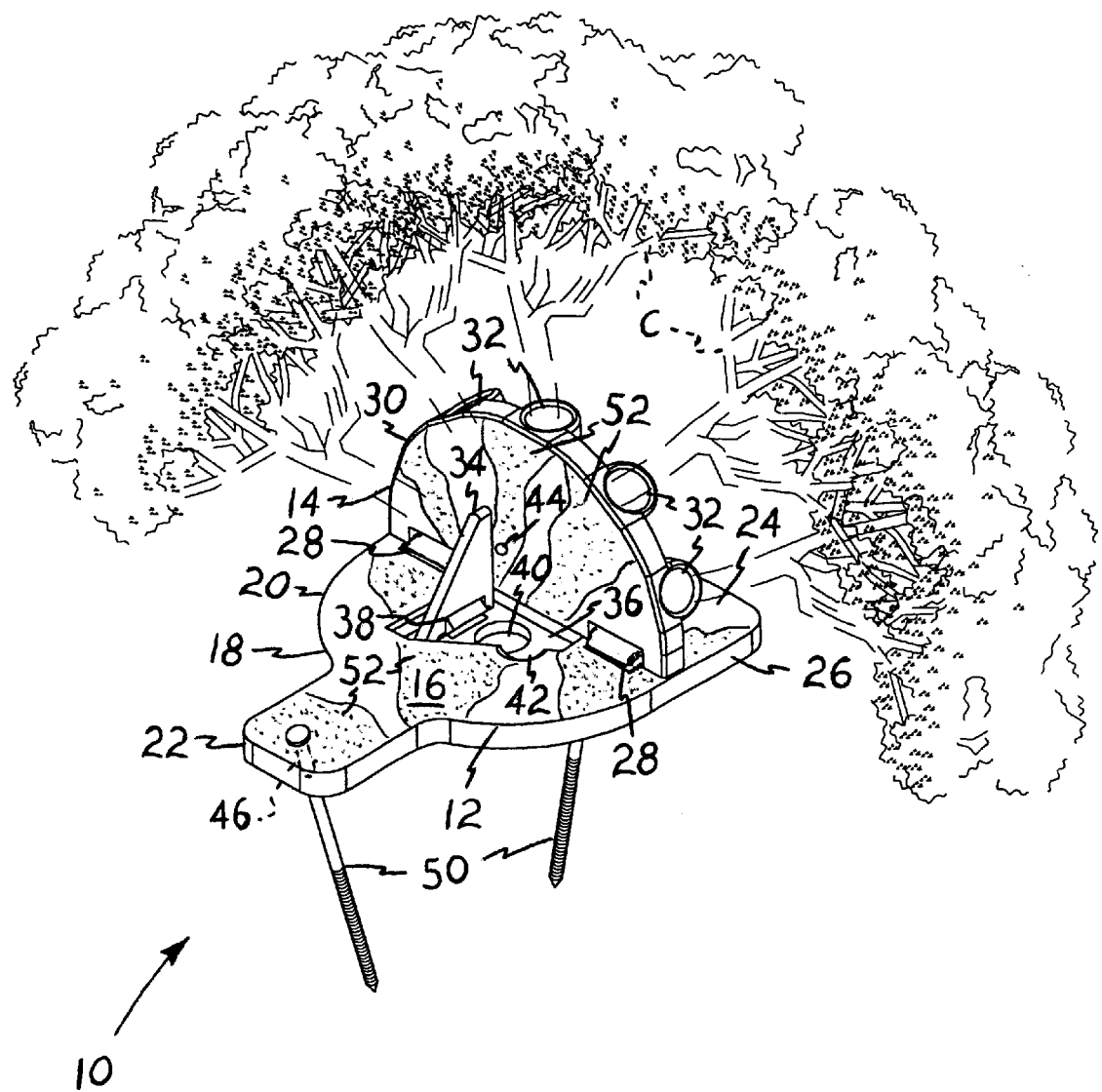
FIG. 2 is a rear perspective view of the stand of FIG. 1, showing further details thereof.
Figure 3:
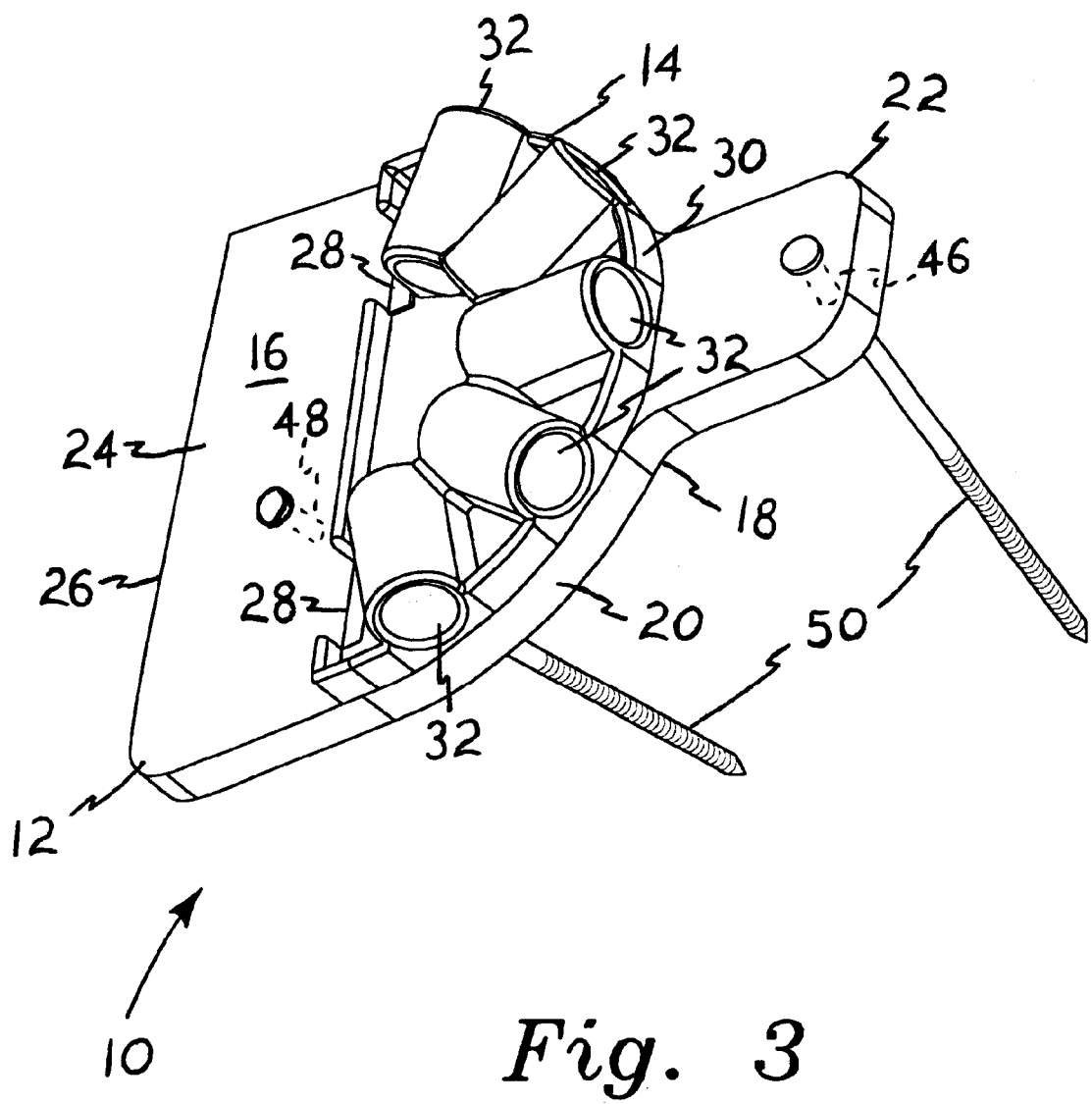
FIG. 3 is a front perspective view of the present portable camouflage stand, showing the folding of the branch holder adjacent the base for storage of the device.

FIGS. 2 and 3 provide more detailed views of the present portable camouflage stand 10. The base 12 of the stand 10 comprises a generally flat, planar sheet of material (some thickness may be provided by means of a peripheral flange and underlying ribs, as desired), with a flat upper surface 16. The base 12 has a first end portion 18 with a generally semicircular periphery 20 and an anchor tab 22 extending therefrom, and an opposite second end portion 24 with a generally rectangular periphery 26.

The camouflage holder portion 14 is foldably secured to the base 12 by a pair of hinges 28, disposed laterally across the base 12 generally between the semicircular first end 18 and rectangular second end 24. The camouflage holder portion 14 comprises a generally flat, planar structure (a peripheral flange and internal ribs may be provided, as in the base 12) with a semicircular periphery 30. The camouflage holder periphery 30 is generally congruent with the semicircular periphery 20 of the first end portion 18 of the base 12, when the camouflage holder portion 14 is folded flat against the upper surface 16 of the first-end portion 18 of the base 12, as shown clearly in FIG. 3 of the drawings.

The camouflage holder portion 14 includes at least one camouflage vegetation holder socket 32 along the periphery 30 thereof and generally coplanar therewith, and preferably includes, a series of such sockets 32 thereon in order to hold a plurality of branches of camouflage material C, as shown in FIGS. 1 and 2 of the drawings. The camouflage holder sockets 32 are preferably evenly spaced about the semicircular periphery 30 of the camouflage holder portion 14 of the device 10 in a radial, fan like array defining a single plane, i. e., with their open outer ends disposed along the periphery 30 and the depths of the generally cylindrical sockets 32 extending toward the center of the semicircular arc defined by the camouflage holder portion 14 of the device 10. Such a radial array of camouflage holder sockets 32 deploys the camouflage material C held therein in a radial, fan like array to provide optimum concealment to the sides and to some height above the device 10, yet spreads the branches of the camouflage material C so that a camera lens, gun barrel, etc. may have an unobstructed shot through the camouflage material C as shown in FIG. 1 of the drawings.

A brace 34 is foldably disposed in a recess 36 in the upper surface 16 of the base portion 12, as shown in FIG. 2 of the drawings. The brace 34 is secured to the base 12 by a hinge 38, which permits the brace 34 to fold flush with the upper surface 16 of the base portion 12. This allows the camouflage holder 14 to fold flat against the upper surface 16 of the base 12 for compact storage and carriage of the device 10 when it is not in use, as shown in FIG. 3. Once the camouflage holder 14 has been raised perpendicular to the base 12, the brace 34 may be accessed by means of a finger hole 40 formed through the base 12, and/or a fingernail slot 42 adjacent the brace receptacle. A resilient button 44 or the like protrudes slightly from the face of the camouflage holder portion 14, to lock the brace 14 in an extended position as desired and preclude inadvertent retraction of the camouflage holder 14.

The present portable camouflage stand 10 is relatively small and lightweight, and may easily be carried in a large pocket, game bag, back pack, etc. as desired. The relatively light weight provided by the plastic materials used in its construction, also provide for ease of carriage. It will be seen that the weight,and surface area of typical camouflage materials C installed therein, are many times greater than the weight and surface area of the present stand 10. While the present stand 10 may be balanced reasonably well with some care exercised in the selection and placement of camouflage materials C therein, it will be seen that any wind much more than a very light breeze may upset the stand 10 when deployed in the field, unless some means of anchoring the stand 10 to the underlying surface is provided.

Accordingly, ground anchor means is provided, comprising first and second passages 46 and 48 formed respectively through the anchor tab extension 22 and the second end portion 24 of the base 12. A corresponding pair of ground anchor spikes 50, e.g., landscape timber anchoring spikes, pins, or the like, are inserted through the two anchor passages 46 and 48, and driven into the underlying surface by any suitable means (hammer, convenient rock, etc.). Such landscaping spikes are quite strong and durable, and, are capable of penetrating even somewhat rocky soil structures.

The penetration of the two spikes 50 into the underlying surface, provides a solid anchor for the present camouflage stand 10 in about any location desired. The pins, 50 are easily pulled from the ground when removal of the stand 10 is desired.

The present portable stand for camouflage 10 is easily carried to the desired site for hunting, photography, or merely observation of game or other wild animals, by means of its light weight and compact configuration when folded. When the desired site is reached, the hunter H or other user deploys the stand by extending the camouflage holder portion 14 from its folded position against the base portion 12, extending the camouflage holder brace 34, and locking the brace 34 in position by pushing it slightly past the retaining protuberance or button 44 to hold the camouflage holder portion 14 in an upright position generally perpendicular to the plane of the base 12. The hunter H or user may then drive the anchor pins 50 through the respective anchor receptacles 46 and 48 and into the underlying surface to temporarily but positively secure the stand 10 in place as desired.

The hunter H or other user of the stand 10 may then cut some convenient vegetation (adjacent shrubs, small tree branches, etc.), selecting the foliage to allow the branches to fit reasonably well into the camouflage holder sockets 32 of the camouflage holder portion 14 of the device 10. Additional means, e.g., shims, set screws, etc., may be provided as desired to secure relatively small diameter branches in place within the sockets 32. The radial, fan like array of the camouflage holder sockets 32 results in the camouflage material C secured therein having a similar configuration, which provides a relatively wide and high "wall" of fresh and natural camouflage material, yet the material is deployed generally in a single plane for observation therethrough.

While the camouflage material C provides reasonably good cover for the stand 10 and hunter H or other person situated therebehind, additional camouflage may be provided for the stand 10 itself, by means of a camouflage pattern 52 disposed over at least the upper or exposed surfaces of the device 10. The camouflage pattern may comprise a single natural color, or preferably two or more colors (different shades of green and/or tan, brown, etc.) having a dull or flat finish, as is known in the art of camouflage. While such camouflage means 52 covering the stand 10 provides only flat, two dimensional camouflage, it provides better concealment for the stand itself than would a plain, uniform finish of brighter colors or more reflective surfaces which might be glimpsed through gaps in the natural camouflage material C.

When the hunt, photography session, observation, etc. has been completed, the hunter H or other party may remove and discard the camouflage material C, pull the stakes or pins 50 from the ground using any convenient tool or means, stow the stakes 50, and retract the camouflage holder brace 34 and fold the camouflage holder portion 14 flush against the first end 18 of the base 12 for compact storage of the device 10. The camouflage stand 10 may be conveniently stored or carried as desired until further use is needed, with the compact folded size and light weight providing considerably greater convenience than conventional blinds and other camouflage means developed in the past.

In conclusion, the present camouflage stand provides a considerable improvement over the relatively heavy and bulky camouflage devices developed in the past. The use of native materials for camouflage (freshly cut brush, shrubs, branches, etc.) provide a considerably more realistic appearance for the present stand than that provided by conventional blinds, with their flat, two dimensional surfaces. While natural materials have been used for camouflage in the past, none of the prior art have developed a stand for holding such materials to provide complete camouflage or concealment for a person while using a relatively small and light weight stand, as provided by the present invention. The folding means provided for the present stand provides even further benefits. It should be noted that other variations on the present invention are embraced by the specification, including means which would allow the component parts of the invention to be broken down and separately stored for later assembly, if so desired. Accordingly, the present camouflage stand will find great favor among hunters, observers and photographers of wildlife, and any others who have need or desire for convenient, temporary, yet realistic and effective concealment in the outdoors.

It is to be understood that the present invention is not limited to the embodiments described above, but encompasses any and all embodiments within the scope of the following claims.

I claim:

1. A portable stand for camouflage, comprising:
    a generally flat base having at least a first end portion, a second end portion opposite said first end portion, and an upper surface, said base further including a recess having a predetermined shape defined in said upper surface of said base;
    a generally flat, planar camouflage holder portion foldably extending from said base;
    at least one vegetation holder socket for holding a corresponding at least one branch of camouflage material therein, disposed with said camouflage holder portion and generally coplanar therewith; and
    said brace foldably extendable from said base for selectively bracing said camouflage holder portion in an open position generally perpendicular to said base, said brace having a shape corresponding to the shape of said recess defined said base and adapted to be received therein.

2. The portable stand according to claim 1, wherein said at least one vegetation holder socket comprises a plurality of vegetation holder sockets disposed about said camouflage holder portion, with said plurality of vegetation holder sockets defining a single plane.

3. The portable stand according to claim 2, wherein:
    said camouflage holder portion has a generally semicircular periphery; and
    said plurality of vegetation holder sockets define a single plane for selective deployment of a plurality of branches of vegetation in a radial, fan-like array.

4. The portable stand according to claim 1, further including:
    at least one hinge defining a hinge line disposed laterally across said base; and
    said at least one hinge connecting said camouflage holder portion foldably to said base.

5. The portable stand according to claim 4, further including means for selectively locking said brace in an extended position for bracing said camouflage holder portion in an open position.

6. The portable stand according to claim 4, further including brace access means for selectively deploying said brace from a retracted position within said base.

7. The portable stand according to claim 1, wherein:
    the brace access means for selectively deploying said base includes an opening defined in said recess and a fingernail slot defined in said base adjacent to said recess; and the portable stands further includes
ground anchor means, comprising first and second passages disposed respectively through said first end portion and said second end portion of said base; and
first and second ground anchor spikes removably deployable through said first and second passages of said base.

8. The portable stand according to claim 1, further including camouflage means disposed over at least a portion of said base and said camouflage holder portion for camouflaging said base and said holder.

9. The portable stand according to claim 1, wherein said base and said camouflage holder portion are formed of plastic.

10. A portable stand for camouflage, comprising:
a generally flat base having at least a first end portion, a second end portion opposite said first end portion, and an upper surface;
said base further including a recess defined in said upper surface, an opening defined in said recess, and a fingernail slot defined in said base adjacent to said recess;
said first end portion of said base having a generally semicircular periphery with an anchor tab extending therefrom;
said second end portion of said base having a generally rectangular periphery;
a generally flat, planar camouflage holder portion foldably extending from said base;
said camouflage holder portion having a generally semicircular periphery closely congruent with said semicircle periphery of said first end portion of said base when said camouflage holder portion is folded adjacent said base;
at least one vegetation holder socket for holding a correspondence at least one branch of camouflage material therein, disposed upon said semicircular periphery of said camouflage holder portion and generally coplanar therewith; and
a brace foldably extendable from said base for selectively bracing said camouflage holder portion in an open position generally perpendicular to said base.

11. The portable stand according to claim 10, wherein said at least one vegetation holder socket comprises a plurality of spaced apart vegetation holder sockets disposed about said periphery of said camouflage holder portion, with said plurality of vegetation holder sockets defining a single plane.

12. The portable stand according to claim 11, wherein:
said plurality of vegetation holder sockets are evenly spaced about said periphery of said camouflage holder portion for selective deployment of a plurality of branches of vegetation in a radial, fan-like array.

13. The portable stand according to claim 10, further including:
at least one hinge defining a hinge line disposed laterally across said base; and
said at least one hinge connecting said camouflage holder portion foldably to said base.

14. The portable stand according to claim 13, further including means for selectively locking said brace in an extended position for bracing said camouflage holder portion in an open position.

15. The portable stand according to claim 12, wherein the means for selectively locking said brace includes a resilient button protruding from one side of said camouflage holder portion.

16. The portable stand of according to claim 10, further including:
ground anchor means, comprising first and second passages disposed respectively through said anchor tab and said second end portion of said base; and
first and second ground anchor spikes removably deployable through said first and second passages of said base.

17. The portable stand according to claim 10, further including camouflage means disposed over at least a portion of said base and said camouflage holder portion for camouflaging said base and said holder.

18. The portable stand according to claim 10, wherein said base and said camouflage holder portion are formed of plastic.

* * * * *